Oct. 29, 1968  N. L. WRIGHT  3,407,442
MACHINE FOR IN-PLACE MOLDING OF CAP GASKETS
Filed Sept. 1, 1966  4 Sheets-Sheet 1

INVENTOR
NORBERT L. WRIGHT
BY Greist, Lockwood, Greenawalt
& Dewey
ATT'YS.

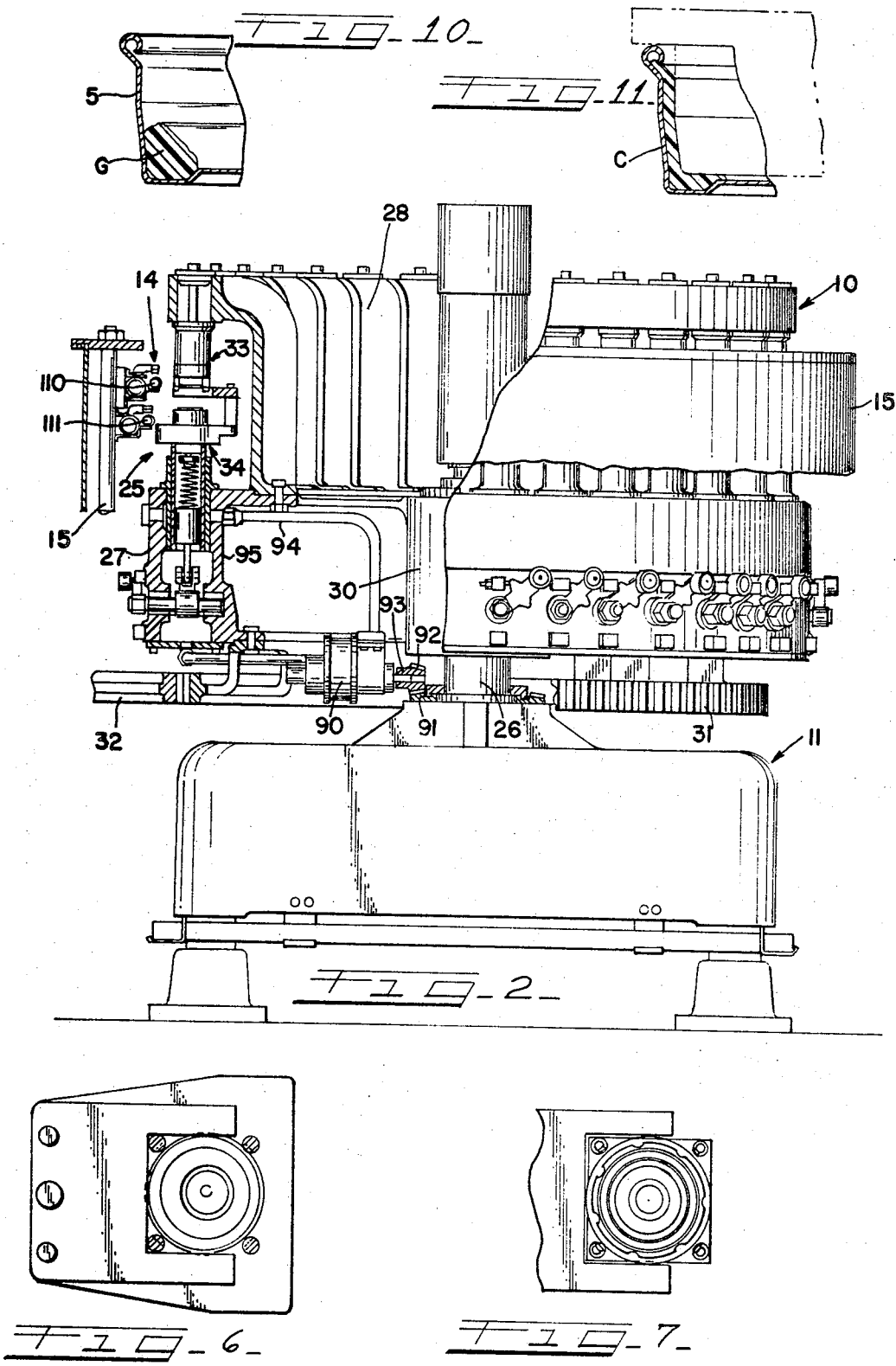

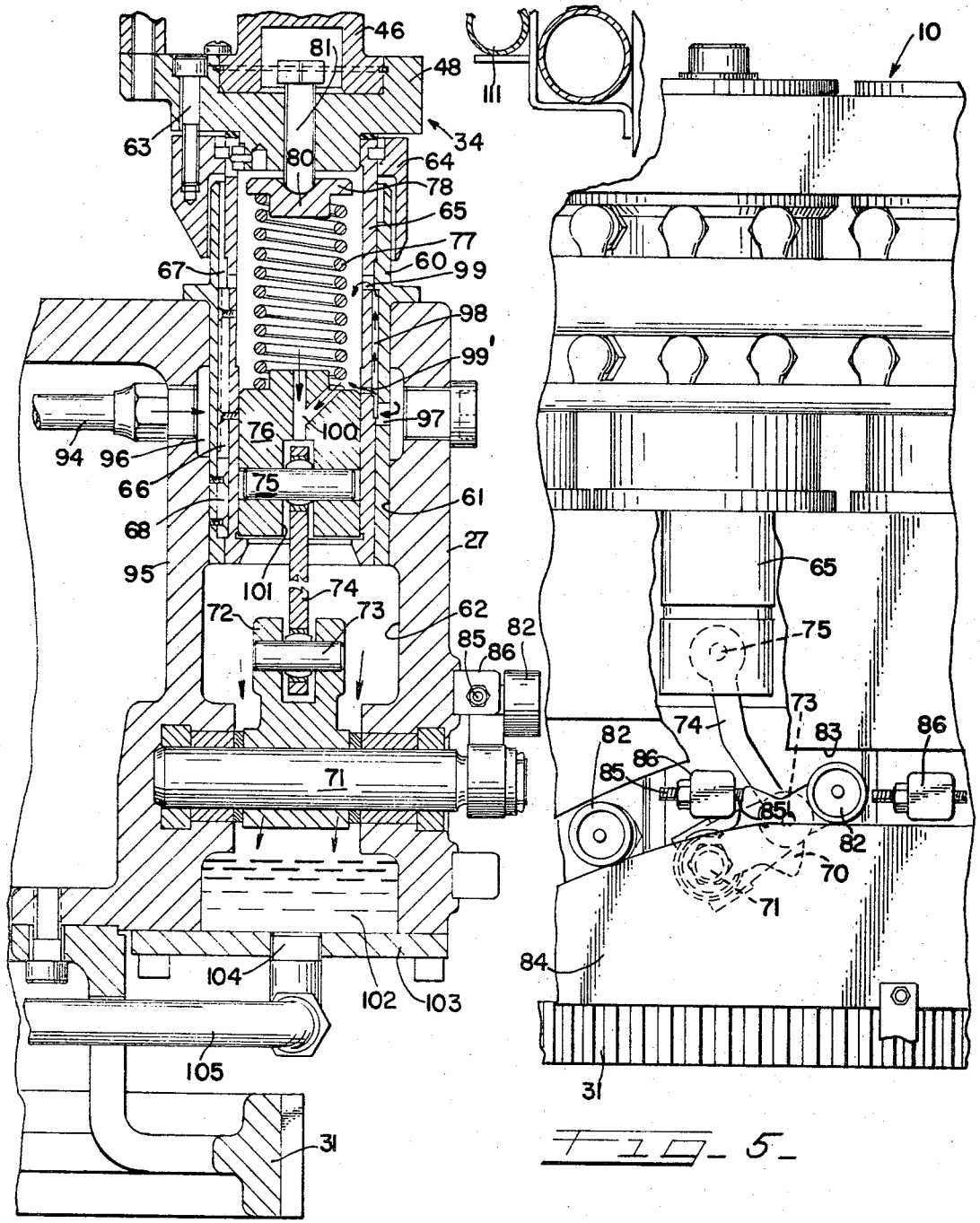

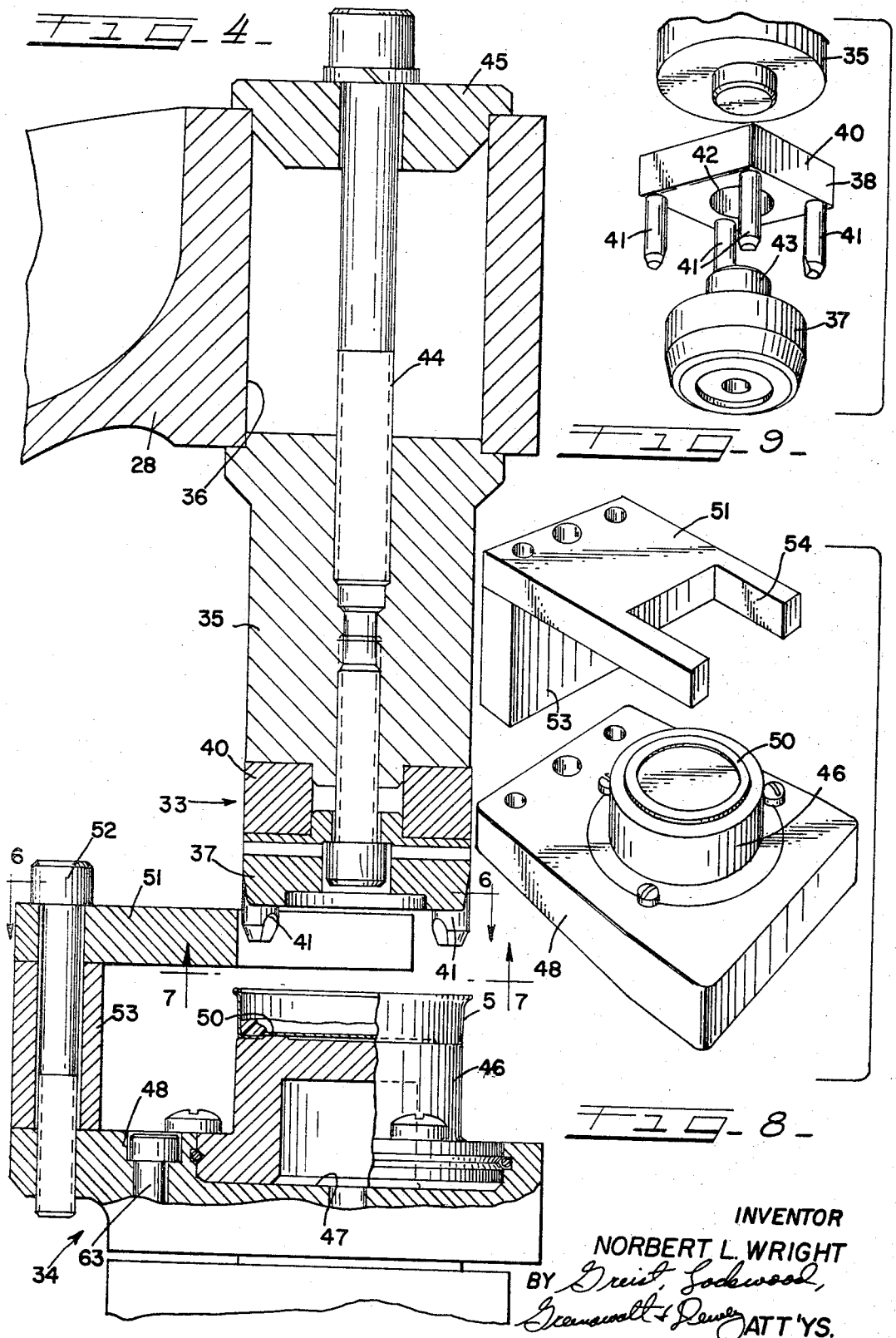

United States Patent Office 3,407,442
Patented Oct. 29, 1968

3,407,442
MACHINE FOR IN-PLACE MOLDING OF
CAP GASKETS
Norbert L. Wright, Park Ridge, Ill., assignor to Continental Can Company, Inc., New York, N.Y., a corporation of New York
Filed Sept. 1, 1966, Ser. No. 576,644
15 Claims. (Cl. 18—20)

This invention relates to the forming or molding of plastic materials and is more particularly concerned with improvements in a molding machine which is especially adapted for in-place molding of resin compositions such as the thermosetting materials employed as resilient gaskets for liners in container closure caps or similar articles.

Closure caps for bottles, jars and cans are generally provided with a resilient gasket material on their container engaging inner sides so as to seal the same against the escape of the contents of the container. Elastomeric materials are most commonly employed which include rubber and certain plastic compounds, and machines have heretofore been designed for use in the manufacture of such caps having such gasket materials which mold the plastic compounds in the desired shape and thickness. One such machine is disclosed in Simpson Patent No. 2,954,585, dated Oct. 4, 1960, which has been used successfully for shaping and curing liner forming plastic compounds in crown caps. In this machine a succession of inverted cap shells, each having a quantity of an uncured plastic deposited therein, are fed along a horizontal path to the periphery of a vertical axis turret. The turret carries circumferentially spaced pairs of clamp forming members on its periphery to which the plastic containing cap shells are fed successively. Each pair of clamp forming members comprises relatively movable upper and lower members, the uppermost one of which constitutes a die for shaping the plastic into liner form upon closing of the two clamp members upon each other. The caps are held on the turret by the co-acting clamp members and carried along a circular path while heat is applied to cure the plastic liners. The caps with their cured liners are finally discharged as the clamp members are successively opened. The clamp members of each pair thereof remain open long enough to receive the next plastic containing cap shell and then again close to repeat the shaping and curing operations. In the operation of this machine and other machines of this type, some problems have been encountered due primarily to the effects of the heat applied in effecting a cure of the plastic material. The burners operating to supply heat for curing the cap lining material raise the temperature of the clamp members and associated elements to a point where it is necessary to resort to special heat resistant lubricants in order to properly lubricate the movable elements which operate the clamp members. Such lubricants are not only costly but they have a silicon base and when they are exposed to the flames from the burners a chemical action results which produces silicon dioxide, thereby destroying the lubricating qualities of the lubricant and converting it to an abrasive which causes rapid wear of the moving machine elements. In the operation of these machines it is the practice to occasionally swab the lubricant on the movable elements associated with the clamp members with the result that some of the lubricant drips down where it is hit by the flames of the burner and converted to silicon dioxide which decreases the life of the reciprocating parts and causes frequent shutdown for repairs and replacement of worn parts. Applications of excessive amounts of lubrication will run down the die forming clamps and be deposited in caps that must be scrapped due to contamination.

It is a general object of the present invention to provide a machine of the type described with embodies improved mechanism for clamping the cap shells and molding the gasket forming material and the need for heat resistant lubricant is eliminated with a resultant increase in the life of the machine and elimination of frequent shutdown for repair.

Another object of the invention is to provide a machine of the type described wherein the turret supported clamps for holding the caps comprise an upper member which is fixed relative to the turret and which carries the molding die and a lower member which is movable in a vertical path toward and from the upper member and which has a cap stripping member associated therewith for insuring release of the cap from the molding die.

It is still another object of the invention to provide a cap molding machine of the type described having cooperating fixed upper die carrying and movable lower cap carrying clamp members with a cap locator associated with the upper die for properly locating the cap with respect to the die surface even though the machine may expand unevenly during operation with a resulting misalignment between the upper and lower clamp members.

It is a further object of the invention to provide a molding machine of the type described wherein die carrying clamp members are mounted about the periphery of the turret for receiving caps and clamping the same while carrying them through a path where the clamping members are exposed to the flames from a series of burners and wherein provision is made for supplying lubricant to the movable clamp operating members through a closed loop system so that a much less expensive lubricant may be employed without subjecting the same to flame contact or such high temperatures as to break down the lubricant and destroy or decrease its lubricating characteristics.

These and other objects and advantages of the invention will be apparent from a consideration of the molding machine which is shown by way of illustration in the accompanying drawings wherein:

FIGURE 2 is a side elevation of the machine to a somewhat smaller scale with portions thereof broken away;

FIGURE 3 is a partial vertical section, to an enlarged scale, the section being taken on a radial plane extending through one of the lower clamp members;

FIGURE 4 is a partial vertical section, to an enlarged scale, taken on the same radial plane as FIGURE 3 and extending through the uppermost clamp member;

FIGURE 5 is a fragmentary side elevation showing a portion of the turret;

FIGURE 6 is a cross section taken on the line 6—6 of FIGURE 4, to a smaller scale;

FIGURE 7 is a cross section taken on the line 7—7 of FIGURE 4, to a smaller scale;

FIGURE 8 is an exploded perspective view showing a lower cap supporting clamp member and associated cap stripper device;

FIGURE 9 is an exploded perspective view showing an upper molding die support and clamp member and associated cap locator device;

FIGURE 10 is a fragmentary section, to an enlarged scale, through the skirt of a cap shell prior to the molding operation; and FIGURE 11 is a view similar to FIGURE 10 following the molding operation.

Figure 1:
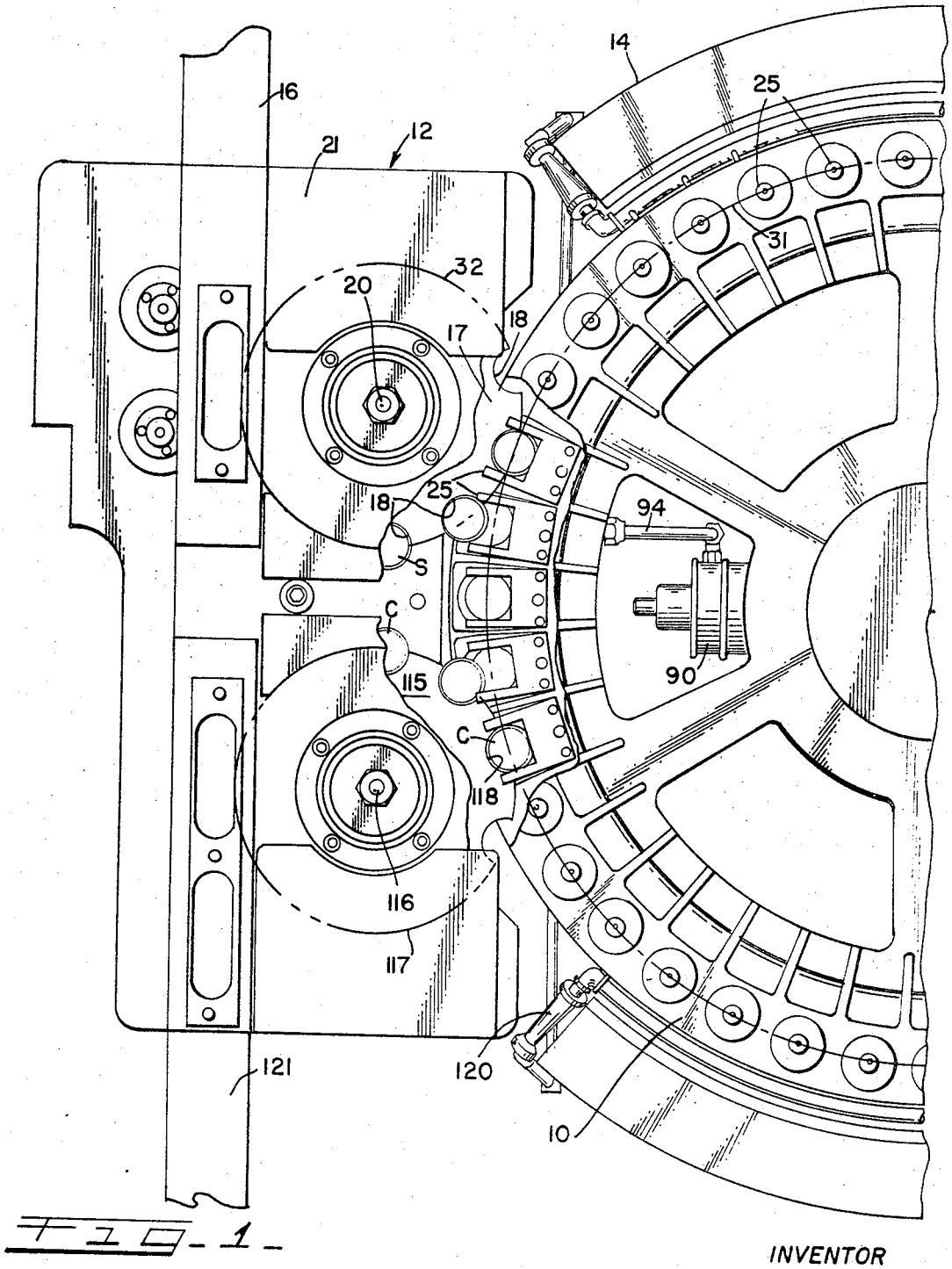
FIGURE 1 is a plan view of a machine for molding cap liners which embodies therein the principles of the invention, with portions of the machine being broken away or omitted.

The machine illustrated in the drawings comprises a cap conveying and gasket molding turret 10 (FIGURES 1 and 2) which is mounted for rotation about a vertical axis above a horizontally disposed supporting base 11. A cap shell infeed and finished cap outfeed assembly 12 is supported on a suitable frame (not shown) at one side of the machine and at the proper elevation to feed cap shells S into the machine and to remove the finished caps C from the machine. A burner assembly 14 is mounted to extend partially around the upper portion of the turret 10 and is supported on suitable framing indicated at 15.

The cap shells S (FIGURES 4, 7 and 10) are each provided with a heat curable gasket material G in the form of a paste, which may be applied into the peripheral corner of the cap formed by the meeting of the cap skirt with the cap top panel in a conventional manner, such as, by spinning the cap shell rapidly beneath a gun which squirts a quantity of gasket forming plastic material out into the corner formed at the intersection of the cap skirt and the top panel. The cap shells S are delivered to the infeed mechanism 12 on a belt conveyor 16 which may be driven by connection with the power drive for the machine. The belt 16 advances successive cap shells S to a feed wheel 17 and associated guides (not shown) direct the cap shells into pockets 18 in the wheel. The wheel 17, which is provided with a plurality of the peripherally spaced pockets 18 for receiving the cap shells S, is rotatably mounted on the vertically disposed driven shaft 20. The feed wheel 17 is disposed in a horizontal plane above a feed table 21 which is on the same level at the conveyor belt 16. The feed wheel 17 and associated guides deliver successive cap shells S to clamping and holding assemblies 25 which are spaced about the periphery of the turret 10.

The turret 10 (FIGURE 2) is rotatably mounted on a shaft forming post 26 which extends vertically from the center of the machine base 11. The turret 10 comprises a cylindrical lower body forming portion 27 and a bowl-like upper portion 28, with the two members bolted or otherwise secured together as shown in FIGURE 2. The lower section or body forming member 27 has an internal hub 30 which is journaled on the vertical post 26 by means of suitable bearing structures (not shown). A ring gear 31 is secured in spaced relation on the bottom of the lowermost turret member 27. A driving gear 32 mounted on the lower portion of the vertical drive shaft 20 operates to turn the turret through connection of the drive shaft 20 with a suitable drive motor or other power means (not shown). The uppermost turret member 28 serves as a support for the upper portions 33 of the molding die assemblies 25 while the lower turret member 27 carries the lower portions 34 of the assemblies 25.

Each upper portion or sub-assembly 33 (FIGURES 2, 4, 7 and 9) of each molding die assembly 25 comprises a cylindrical body member 35 which extends downwardly below a vertical bore 36 in the outer rim of the uppermost turret member 28 and carries on its lowermost end a molding die 37 having a bottom contour designed to form the liner material in the cap shell into the desired shape so that it extends in the illustrated form (FIGURE 11) of the cap throughout the margin of the top panel and upwardly along the inside wall of the cap skirt. As shown in FIGURE 9, the molding die 37 has associated with it a cap locator device in the form of a flat rectangular plate 40 with four depending locator pins or equivalent projections 41 at the four corners thereof and radially spaced from a center aperture 42 which receives a center hub portion 43 on the molding die 37. The die 37 and the locator 38 together with the body member 35 are clamped in position on the rim portion of the upper turret member 28 by a clamping bolt assembly, indicated at 44 in FIGURE 4, with the top clamp member 45 seated in the top of the bore 36 and co-operating with the body 35 to center the assembly. When the assembly 33 is properly mounted on the turret member 28 the locator pins 41 extend downwardly of the four corners of the base plate 40 a sufficient distance below the lower face of the die 37 to properly center the cap shell S relative to the die 37 so as to insure proper molding relationship regardless of any misalignment between the upper and lower clamp members which may result from uneven expansion of the turret and associated members.

The lower cap shell supporting and lifting mechanism which constitutes the lower assembly portion or sub-assembly 34 of each molding die assembly 25 comprises a supporting pad member 46 (FIGURES 4 and 8) on which the cap shell S is positioned in inverted relation with the open side thereof uppermost. The pad 46 is secured in removable relation in a pocket forming recess 47 in the top face of a lifting plate member 48. The top surface of the pad 46 is contoured as indicated at 50 to conform generally to the outside surface of the top panel in the shell S, and the pad 46 projects above the top face of the lifting plate 48 so that the cap shell S is supported in an elevated position. The lifting plate 48 has associated therewith a cap stripping device in the form of a rectangular plate 51 which is secured by bolts 52 to an inside marginal portion of the lifting plate 48 and which is spaced above the same a predetermined distance by the spacer block 53 so as to provide adequate clearance for positioning the cap on and removing the same from the supporting pad 46. The plate 51 is provided with an outwardly opening recess 54, the width of which is somewhat less than the diameter of the cap shell S, and the plate 51 is positioned above the top of the supporting pad 46 a sufficient distance to accommodate the cap shell S. It is located relatively to the die or punch 37 when in its retracted position so as to insure that the cap shell S will be stripped from the die 37 when the plate 48 is lowered so as to release the finished cap C for removal from the clamping and molding assembly 25. The sub-assembly 34 is mounted for reciprocable movement in a vertical direction. It is received in a tubular housing 60 which is seated in the bore 61 constituting the upper portion of a vertically extending chamber 62 in the lower turret member 27. The lifter plate member 48 is secured by bolts 63 to a downwardly opening cap member 64 on the upper end of a tubular sleeve forming member 65 which is mounted for vertical movement in the tubular housing 60 and retained against rotation about the vertical axis by the key 66 attached thereto and sliding in the keyway 67 with a stop member 68 at the bottom of the housing 60 to limit the downward movement of the sleeve 65. The lifter plate assembly 34 is raised and lowered by a cam operated lever arm 70 (FIGURE 5) mounted on the end of a shaft 71 which is journaled in the lower portion of the turrent member 27 and extends across the bottom of the chamber 62. The shaft 71 has one end of an internal lever arm 72 mounted thereon and connected at its other end by the pivot 73 with the lower end of a link bar 74 which has its upper end connected by the pivot 75 with a slide block member 76 mounted in sliding relation within the lower end of the sleeve 65. A compression spring 77 is seated on the upper end of the slide block 76 with a cap forming member 78 at its upper end in the upper face of which there is a pocket 80 for receiving the lower end of a bolt 81 adjustably mounted in the lifter plate 48. The spring 77 normally holds the block 76 in the bottom of the sleeve 65 and controls the amount of pressure applied in lifting the cap shell into engagement with the molding die 37 at the same time providing a safety device in the case of any jam-up. The operating arm or lever 70 for lifting the plate assembly 34 carries at its free end a cam roller 82 which is operative in a cam track 83 in a ring cam 84 supported in a suitable manner outboard of the bottom member 27 of the turret 10. Each of the operating arms or levers 70 has associated with it an adjustable stop pin 85 which is mounted in a suitable protuberance 86 on the lower face of the turret member 27.

The lifter plate assembly 34 is heated by the burner assembly 14, which is hereinafter described, and provision is made for supplying a lubricant to the contacting surfaces of the moving parts incorporated in the lifter assembly 34. The lubricant is supplied through a closed circuit and circulated by means of a pump 90 (FIGURES 1 and 2) which may be mounted in the bottom of the turret 10 and driven by a bevel gear 91 fixed on the base 11 at the foot of the center column 26 and engaging the pinion gear 92 on the drive shaft 93 of the pump 90. A supply line 94 runs from the pump 90 to the turret wall 95 (FIGURE 3) and opens into a lubricant receiving groove 96 in the internal wall of the upper portion 61 of the chamber 62. Apertures 97 in the housing 60 permit the lubricant to enter axial grooves 98 in the external wall of the sleeve member 65 which are in communication with the interior of the latter through apertures 99 and 99'. The slide block 76 is provided with a Y-shaped passage 100 for the lubricant to pass down into the recess 101 in the bottom of the block where the upper end of the link 74 is mounted on the cross pin 75. The lubricant is free to drip down over the pin 71 and into a sump forming area 102 at the bottom of the chamber 62, the lower end of which is covered by the plate 103, and a connection at 104 with a conduit 105 permits return of the lubricant to the pump 90 to complete the circuit. The sump 102, of course, extends about the periphery of the bottom turret member 27. With the arrangement shown, the lifter plate 48 may be heated to a substantial degree without raising the temperature of the circulating lubricant unduly and ordinary types of less expensive machine lubricants may be used in the machine.

The burner assembly 14 comprises two sets of burners 110 and 111, which are mounted on the framing 15 at the proper elevation and close to the outer periphery of the turret so as to direct the flames from the peripherally spaced series of burner nozzles onto the upper and lower sub-assemblies 33 and 34 of the clamping and molding assemblies 25. By controlling the fuel supplied to the burners 110 and 111 the temperature of the sub-assemblies 33 and 34 may be maintained at the degree required to supply the heat necessary for the molding operation.

The cam track 83 is arranged so as to operate the assemblies 25 to engage and clamp the cap shells S as they are delivered by the infeed wheel 17 (FIGURE 1) between the supporting pads 46 and the molding dies 37 and to hold the cap shells in clamped position while they are carried in a circular path on the rotating turret 10. A discharge wheel 115 is mounted on a vertical shaft 116 which is parallel with and adjacent the drive shaft 20 and which carries a gear 117 engaging in driving relation with the ring gear 31 on the turret 10. The discharge wheel 115 has a plurality of peripherally spaced pockets 118 into which the finished caps are delivered as they are freed by separation of the sub-assemblies 33 and 34 of the clamping and molding assemblies 25 at the end of their circular path just beyond the end 120 (FIGURE 1) of the burner assembly 14. The discharge wheel 115 operates in the same plane as the feed wheel 17 and delivers the finished caps C to an outfeed section or portion 121 of the belt run 16 which advances across the table 21.

In operating the machine, cap shells S are supplied on the belt 16 with a predetermined quantity of the plastic liner material deposited at the junction of the cap skirt and the top panel thereof. The cap shells S are fed to the successive clamping and molding die assemblies 25 by the feed wheel 17. The lower sub-assembly 34 is raised as each assembly approaches the entrance end of the burner assembly 14 and the die 37 forces the liner material into the desired shape, with the cap shells being properly located relative to the die 37 by the pins 41 on the locator device 38. The cap shells are carried about the periphery of the turret 10 while the upper and lower molding die sub-assemblies 33 and 34 are heated by exposure to the flames from the burners 110 and 111. As each die assembly 25 reaches the end of the circular path the lower sub-assembly 34 is lowered to the position shown in FIGURE 4 with the stripper 51 insuring that the finished cap C is released from the molding die 37 so that it is freed for removal from the lower sub-assembly 34. The discharge wheel 115 is timed so as to receive in the pockets 118 thereof the finished caps C which are moved onto the conveyor 121 and removed from the machine.

While particular materials and specific details of construction have been referred to in describing the form of the machine illustrated, it will be understood that other suitable materials and equivalent structural details may be resorted to without departing from the spirit of the invention.

I claim:

1. A machine for in-place molding of cap liners comprising a liner curing turret mounted for rotation on a vertically disposed axis, said turret having circumferentially spaced clamp assemblies for receiving caps which have a predetermined quantity of thermal curable fluid plastic deposited therein and means for feeding the caps to successive clamp assemblies as the turret rotates about its axis, each of said clamp assemblies comprising an upper and a lower clamping member, the upper clamping members being mounted in fixed position on the periphery of the turret, the turret having in its lower portion vertically disposed peripherally spaced bores each communicating at the lower end with a closed lower chamber and the lower clamping member of each of said clamp assemblies being carried on a support member mounted for vertical reciprocating movement in one of said bores with associated operating means so as to open and close the clamping members for receiving and discharging the caps, the upper clamping member of each of said clamp assemblies being in the form of a die dimensioned for snug reception in the cap skirt to shape the cap contained plastic into a liner disc formed on the cap bottom and skirt when the clamping members are closed, the lower clamping member being then co-operable with the die forming upper clamping member in clamping aligned caps to the turret for liner curing, burners disposed about the exterior of the turret for directing heat onto the clamping members so as to at least partially cure the liner, and means for circulating a lubricant through the bores in which the support members for the lower clamping members are mounted.

2. A machine as recited in claim 1, and said lower clamping member of each clamp assembly being carried on a cylindrical support member which is mounted in sliding relation in one of said bores and cam controlled means for reciprocating said support member.

3. A machine as recited in claim 1, and said lower chamber having a sump forming portion for receiving lubricant passing down through the bores and a lubricant return conduit connecting said chamber with said lubricant circulating means.

4. A machine as recited in claim 1, and said lubricant circulating means comprising a pump carried by the turret and connected by a conduit to said closed lower chamber.

5. A machine as recited in claim 4, and said pump having a drive means which is operated in response to rotation of said turret.

6. A machine as recited in claim 4, and said pump having an operating shaft and drive means therefor which includes a drive member connected to the pump operating shaft and driven by rotation of said turret.

7. A machine for in-place molding of cap liners comprising a liner curing turret mounted for rotation on a supporting frame, clamp assemblies mounted in spaced relation about the periphery of said turret for receiving cap shells which have a predetermined quantity of thermal curable fluid plastic deposited therein and means for feeding the caps to successive clamp assemblies as the turret rotates, each of said clamp assemblies comprising a die carrying clamp member in a fixed position on the turret and an oppositely disposed cap supporting clamp member reciprocably mounted on the turret, said turret having bearing forming sleeve members mounted for receiving said cap supporting clamp members and operating mechanism for said cap supporting clamp members housed in chambers in said turret which are in communication with said sleeve members, a series of burners spaced about said turret and positioned to direct heat onto said cap supporting clamp members, and means for circulating lubricant in a closed system through said sleeve members and said communicating chambers.

8. A machine as recited in claim 7, and said lubricant circulating means comprising a lubricant pump having an operating shaft with a drive means operated by rotation of the turret and conduits connecting the pump with said sleeve members and said communicating chambers.

9. A machine for in-place molding of cap liners comprising a liner curing turret mounted for rotation on a vertically disposed axis, said turret having circumferentially spaced clamp assemblies for receiving caps in which a predetermined quantity of thermal curable fluid plastic has been deposited and means for feeding the caps to successive clamp assemblies as the turret rotates about its axis, each of said clamp assemblies having an upper and a lower clamping member with the upper clamping member being mounted in fixed position and the lower clamping member being mounted for vertical movement so as to open and close the clamping members for receiving and discharging the caps, the upper clamping member of each of said clamp assemblies being in the form of a die dimensioned for snug reception in the cap skirt so as to shape the plastic which is deposited therein into a liner formed on the cap bottom and skirt when the clamping members are closed, the lower clamping member being then cooperable with the die forming clamping member in clamping aligned caps to the turret for liner curing, means associated with said upper clamping member of each clamp assembly for centering the cap relative to the liner shaping die, means associated with said lower clamping member for stripping the cap from said liner shaping die when the clamping members are moved to open position, and means spaced about the periphery of the turret for heating the clamping members so as to supply heat to the plastic for at least partially curing the same, and means for discharging the finished caps from the clamp assemblies when the clamping members are moved to open position.

10. A machine for in-place molding of cap liners comprising a liner curing turret mounted for rotation on a vertically disposed axis, said turret having circumferentially spaced clamp assemblies for receiving caps in which a predetermined quantity of thermal curable fluid plastic has been deposited and means for feeding the caps to successive clamp assemblies as the turret rotates about its axis, said clamp assemblies each having an upper and a lower clamping member with one of said clamping members being mounted in fixed position and the other clamping member being mounted for vertical movement so as to open and close the clamping members for receiving and discharging the caps, the one clamping member of each of said clamp assemblies being in the form of a die dimensioned for snug reception in the cap skirt to shape the plastic which is deposited therein into a liner when the clamp members are closed, the clamping members then cooperating to clamp aligned caps to the turret for liner curing, means associated with said one clamping member of each clamp assembly for centering the caps relative to the liner shaping die, means associated with said other clamping member for stripping the cap from said liner forming die when the clamping members are moved to open position, and means spaced about the periphery of the turret for supplying heat to the clamping members thereby to heat the plastic for at least partially curring the liner, and means for removing the lined caps from the clamp assemblies when the clamping members are moved to open position.

11. A machine as recited in claim 10, and said cap centering means comprising a support plate mounted adjacent said liner shaping die and a plurality of spaced projections fixed thereon for engaging the skirt of a cap so as to center the same relative to the shaping die.

12. A machine as recited in claim 10, and said cap centering means comprising a plurality of pin members spaced about the periphery of said liner shaping die and adapted to engage the cap skirt so as to center the same relative to the shaping die.

13. A machine as recited in claim 12, and said pin members being mounted on a support plate which is clamped beneath said liner shaping die.

14. A machine as recited in claim 10, and said cap stripping means comprising a pair of parallel arm members mounted on said other clamping member and spaced apart a distance less than the diameter of the cap, said arm members being mounted in spaced relation to the cap engaging face thereof.

15. A machine as recited in claim 10, and said cap stripping means comprising a plate which is slotted to provide a pair of spaced arm members, which plate is mounted in spaced relation on the cap engaging face of said other clamping member with the arm forming members overlying a portion of the edges of the skirt of a cap when the cap is engaged by said other clamping member.

References Cited
UNITED STATES PATENTS

| | | |
|---|---|---|
| 2,930,081 | 3/1960 | Wilckens et al. |
| 2,937,404 | 5/1960 | Wilckens et al. |
| 2,952,035 | 9/1960 | Gora. |
| 2,954,585 | 10/1960 | Simpson. |

WILBUR L. McBAY, *Primary Examiner.*